Sept. 1, 1959  F. F. ACKERMANN  2,902,302
WOBBLER TYPE STUFFING BOX
Filed July 22, 1957
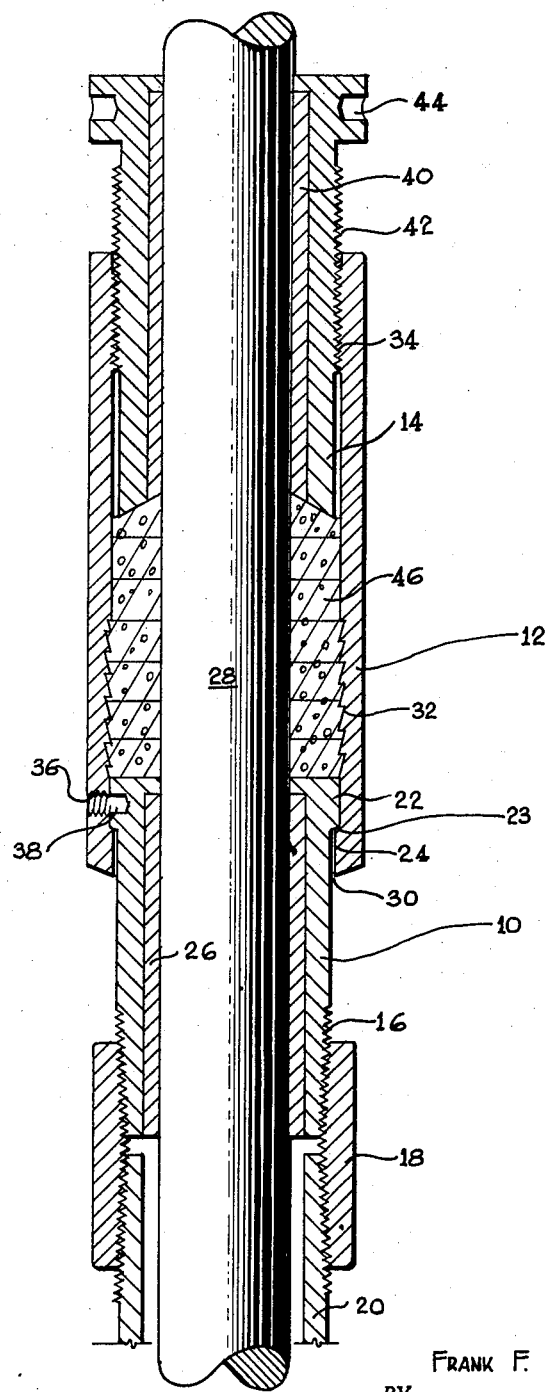
INVENTOR.
FRANK F. ACKERMANN
BY

2,902,302
WOBBLER TYPE STUFFING BOX

Frank F. Ackermann, Odessa, Tex., assignor to Harold T. Ackerman, Birmingham, Ala.

Application July 22, 1957, Serial No. 673,206

3 Claims. (Cl. 286—31)

This invention relates to stuffing boxes and more particularly to an arrangement whereby it is not necessary that the reciprocating rod have exact alignment with the box itself.

The stuffing box described herein is primarily designed to operate on oil wells where the oil is pumped from deep within the ground. The pump-jack of these units often is not in exact alignment with the tubing which extends into the ground. Therefore, the rod "wobbles" or has movement other than an axial reciprocation.

An object of this invention is to provide a stuffing box which will operate satisfactorily when the rod is not in exact alignment with the pipe.

Another object of this invention is to provide a simple method for retaining packing within the box when the retaining member is removed for servicing the packing.

Further objects are to achieve the above with a device that is sturdy, simple, and reliable, yet cheap and easy to manufacture.

The specific nature of the invention as well as other objects, uses, and advantages thereof will clearly appear from the following description and from the accompanying drawing which illustrates the device in an axial sectional view.

One embodiment of this invention as seen in the accompanying drawing has three basic elements: pin 10, sleeve 12, and plunger 14.

The lower end of the pin 10 has standard external pipe threads 16 so that it may be screwed into cuff 18 which is attached to pipe 20 which extends down into the well. The pin 10 is basically a cylindrical tubular member with an outwardly extending flange 22 co-axial with the pin on its upper extreme. The lower surface of this flange is convex arcuate so that it forms a ball and socket joint with the lower flange 24 of sleeve 12. The upper surface of flange 24 is concave arcuate of the same radius so that they form a smooth fit. Therefore, it is possible for the sleeve 12 to move in any direction smoothly with respect to pin 10. This is because of the arcuate contact 23 between the two flanges. Although it is not absolutely necessary, I prefer to provide pin 10 with a brass liner 26. With the corrosive materials often found in the oil pumped from these wells, I have found that the assembly has less corrosion and better general operation if the brass insert is placed within the pin 10. I have shown this brass insert as being integral with the pin 10. Rod 28 is snuggly telescoped within the pin, and therefore, mounted for axial reciprocation.

The sleeve 12 which is generally tubular shaped, fits on top of the pin 10 by the arcuate connection 23 between the flanges 22 and 24. The inside diameter of inward turned flange 24 is larger than the outside of pin 10 in the area 30 as seen in the accompanying drawing. This is so that the sleeve 12 may wobble with respect to the pin 10. The packing is contained within an annular space between the sleeve 12 and rod 28 immediately above the flange 22 of the pin, which forms a fixed abutment at one end of the space. On the inside bore of the sleeve 12 in the lower portion where the packing is found are buttress threads 32; i.e., there is a helical groove of triangular section cut on the inside of sleeve 12. The upper portion of this groove is normal to the axis of the tubular member 12; whereas the lower portion of this groove is at an acute angle to the axis. It is easy to machine; standard tools for this type of work provide for cutting screw threads and are readily adapted to cut this helical groove. By this design, it is a simple matter to have a multiplicity of small ledges formed by the upper portion of the groove which is normal to the axis.

The upper portion of the sleeve 12 has internal screw threads 34. Just above flange 24 of the sleeve, there are thread radial openings 36 which mate with unthreaded radial opening 38 in the flange 22.

The plunger 14 is also a tubular member with a brass liner 40. The brass liner 40 is provided for the same reason as the liner 26. The exterior of the lower portion of the plunger is of less diameter than the inside diameter of the sleeve 12. The inside diameter is approximately the diameter of rod 28 so that a snug fit is formed. The upper portion of the plunger 14 is externally threaded at 42. These threads are mated with the threads 34 so that rotation of the plunger by means of the wrench sockets 44 will cause the plunger 14 to move axially with relation to the sleeve 12. If the sleeve 12 tends to rotate relative to the pin 10, this rotation may be prevented by using threaded studs in the openings 36, 38. The lower edge of plunger forms a movable abutment at one end of the space for packing.

The packing 46 may be of any expandable type. However, I prefer a metal type of packing which comprises a mixture of granular wood, lead, Babbitt metal, graphite, antimony, mica, etc., and an elongated cloth bag. This type of packing is known to the art and as such forms no part of this invention.

To use the stuffing box according to this invention, first the pin 10 with the sleeve 12 connected to it is slipped over the rod 28 and connected with the cuff 18. Then the packing is fitted around the rod 28 within the sleeve 12. Then the plunger 14 is fitted around the rod 28 and screwed tightly into the sleeve 12. As the plunger is tightened, the packing expands into the helical groove of the buttress threads 32. Once it has fitted into the groove, it can be pushed on downward past the lower portion of the groove which forms an acute angle with the axis of the box. But it is difficult for the packing to move upward because then it would have to move past the ledges which are at right angles to the axis of the box. Therefore, the packing remains in place under pressure even if the plunger is removed to service the packing. It is understood of course, that there is only one groove, one lower portion at an acute angle to the axis, and one upper portion normal to the axis. However, since this single groove is in the form of a helix along the inside bore of the sleeve 12, it appears that for the packing to move upward, it must move past a multiplicity of ledges because the same ledge crosses a plane passing through the axis several times (as seen in the drawing). The effect is the same as though there had been several plane grooves cut because the helix angle is small.

If there is some movement of the reciprocating rod other than axial, the sleeve will move relative to the pin. This movement is possible because of the arcuate connection 23 and the clearance 30 between the inward flange 24 and the external portion of the pin 10.

It will be apparent that the embodiments shown are only exemplary and that various modifications can be made in constructions, materials, and arrangements within the scope of the invention as defined in the appended claims.

I claim as my invention:

1. In a stuffing box having a tubular sleeve; a rod mounted for axial reciprocation co-axial with the sleeve; there being an annular space between the sleeve and rod filled with packing; the packing confined on one end of the annular space by a fixed abutment connected to the sleeve, and on the other end by a moveable abutment mounted for axial movement on the sleeve; the improvement comprising: a helical groove of triangular section on the sleeve within the annular space filled with packing, the surface of the groove toward the moveable abutment being normal to the axis of the sleeve, and the surface of the groove toward the fixed abutment being at an acute angle to the axis of the sleeve; so that movement of the moveable abutment toward the fixed abutment moves the packing with the moveable abutment, but upon movement of the moveable abutment away from the fixed abutment the packing does not move because of the normal surfaces.

2. A stuffing box comprising: a vertically disposed cylindrical, tubular pin; external means on the lower end of the pin for attaching it to a pipe; an outwardly extending flange on the upper end of the pin; the lower surface of said flange being convex arcuate; a sleeve co-axial with the pin; an inwardly extending flange on the lower end of the sleeve; the upper surface of the inward flange being concave arcuate; said concave arcuate surface mating said convex arcuate surface and in contact therewith to form a ball and socket joint; internal screw threads in the upper end of the sleeve; a tubular plunger co-axial with the sleeve and pin; means for engaging a wrench at the upper extreme of the plunger; external screw threads immediately below said means for engaging a wrench; said external screw threads mating and in contact with the screw threads at the top of the sleeve; a rod mounted for reciprocation co-axial with the pin, sleeve and plunger; said rod snugly telescoped within the plunger; and packing within the annular space defined by the outside of the rod, inside of the sleeve, lower end of the plunger, and upper end of the pin.

3. The invention as defined in claim 2 with the addition of a helical groove of triangular section on the sleeve within the annular space filled with packing, the upper surface of the groove being normal to the axis of the sleeve, and the lower surface of the groove being at an acute angle to the axis of the sleeve; so that downward axial movement of the plunger moves the packing downward, but upon upward axial movement of the plunger the packing does not move because of the normal surfaces.

References Cited in the file of this patent

UNITED STATES PATENTS

| | | |
|---|---|---|
| 121,985 | Bolthoff | Dec. 19, 1871 |
| 1,879,478 | Pruiett | Sept. 27, 1932 |